H. HEGELER.
AUTOMATIC VIOLIN.
APPLICATION FILED JAN. 17, 1913.

1,147,504.

Patented July 20, 1915.

3 SHEETS—SHEET 1.

WITNESSES
F. C. Barry
E. M. Callaghan

INVENTOR
HERMANN HEGELER

BY Munn & Co.
ATTORNEYS

H. HEGELER.
AUTOMATIC VIOLIN.
APPLICATION FILED JAN. 17, 1913.
1,147,504.
Patented July 20, 1915.
3 SHEETS—SHEET 2.
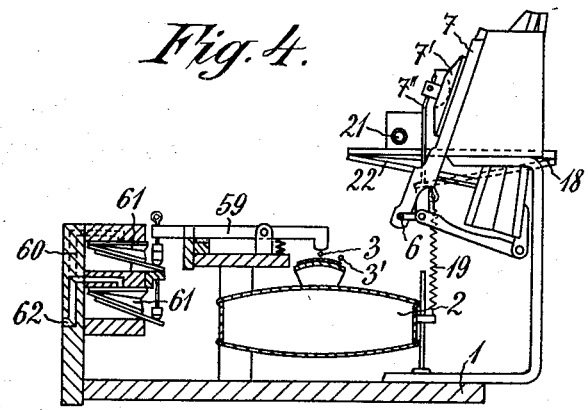
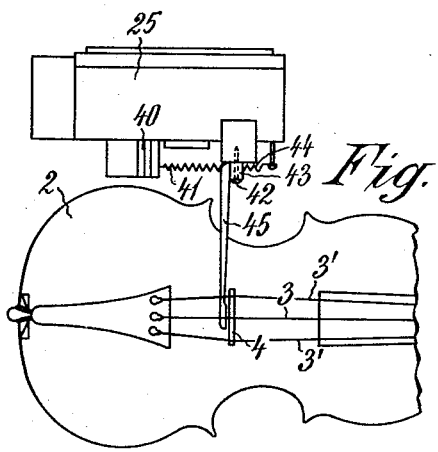
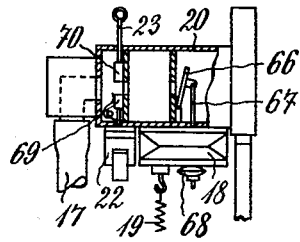
WITNESSES
H. E. Barry
E. M. Callaghan
INVENTOR
HERMANN HEGELER
BY Munn & Co.
ATTORNEYS
COLUMBIA PLANOGRAPH CO., WASHINGTON, D. C.

H. HEGELER.
AUTOMATIC VIOLIN.
APPLICATION FILED JAN. 17, 1913.

1,147,504.

Patented July 20, 1915.
3 SHEETS—SHEET 3.

WITNESSES

INVENTOR
HERMANN HEGELER
ATTORNEYS

UNITED STATES PATENT OFFICE.

HERMANN HEGELER, OF OLDENBURG, GERMANY, ASSIGNOR TO THE FIRM OF FABRIK FÜR PIANOEINBAUAPPARATE "STEMS," GESELLSCHAFT MIT BESCHRANKTER HAFTUNG, OF DRESDEN, GERMANY.

AUTOMATIC VIOLIN.

1,147,504.  Specification of Letters Patent.  Patented July 20, 1915.

Application filed January 17, 1913. Serial No. 742,606.

*To all whom it may concern:*

Be it known that I, HERMANN HEGELER, a subject of the Emperor of Germany, residing at Gaststrasse 23, Oldenburg, in the Empire of Germany, have invented certain new and useful Improvements in Automatic Violins, of which the following is a specification.

The present invention has for its object to provide an automatic violin with rotating bowing member, which instrument in the first place presents the advantage that the space occupied by it is reduced to the minimum, as not only the instrument itself, but also the bowing member are arranged horizontally, the latter being located approximately in a plane parallel with the instrument.

This instrument occupies a very small space as compared to other automatic violins with reciprocating or rotating bowing member, it, owing to the horizontal arrangement of the bowing member and violin belly, being more flatly arranged than other violins. It is therefore adapted for being built into other musical instruments, such as pianos, for example.

Owing to the horizontal arrangement of the bowing member the further important advantage is attained that by suitably tensioning the bowing member a broad and uniform bowing surface is obtained. Joints or connections are entirely dispensed with, so that the playing is not in any way impaired by the latter.

Figure 1:
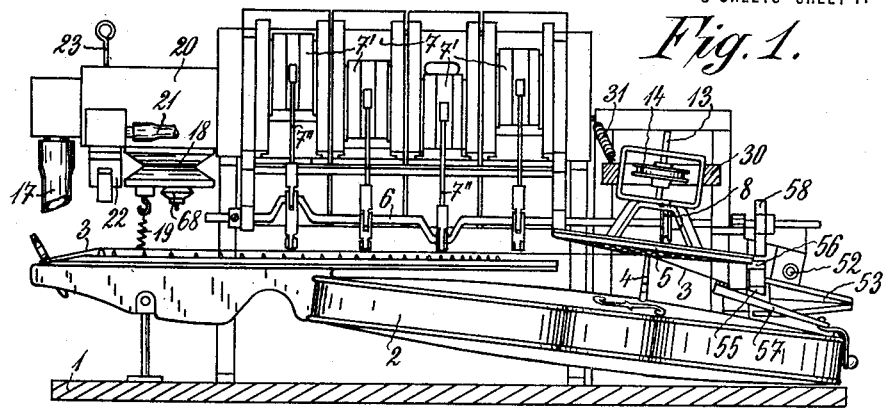
Figure 2:
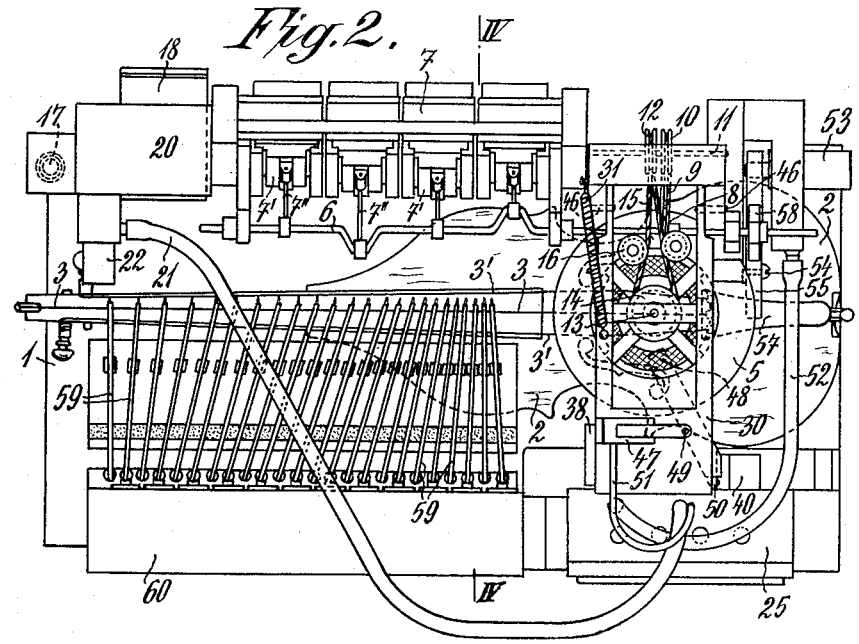
Figure 3:
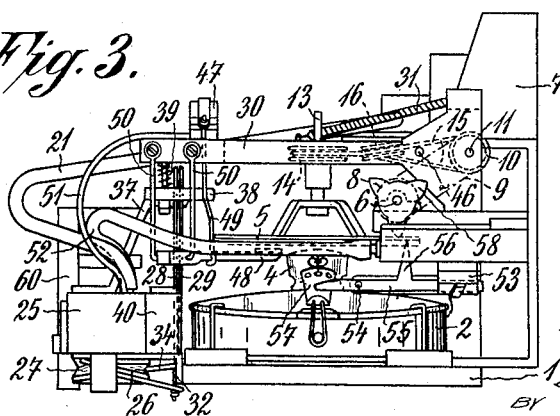
Figures 8, 9, 10:
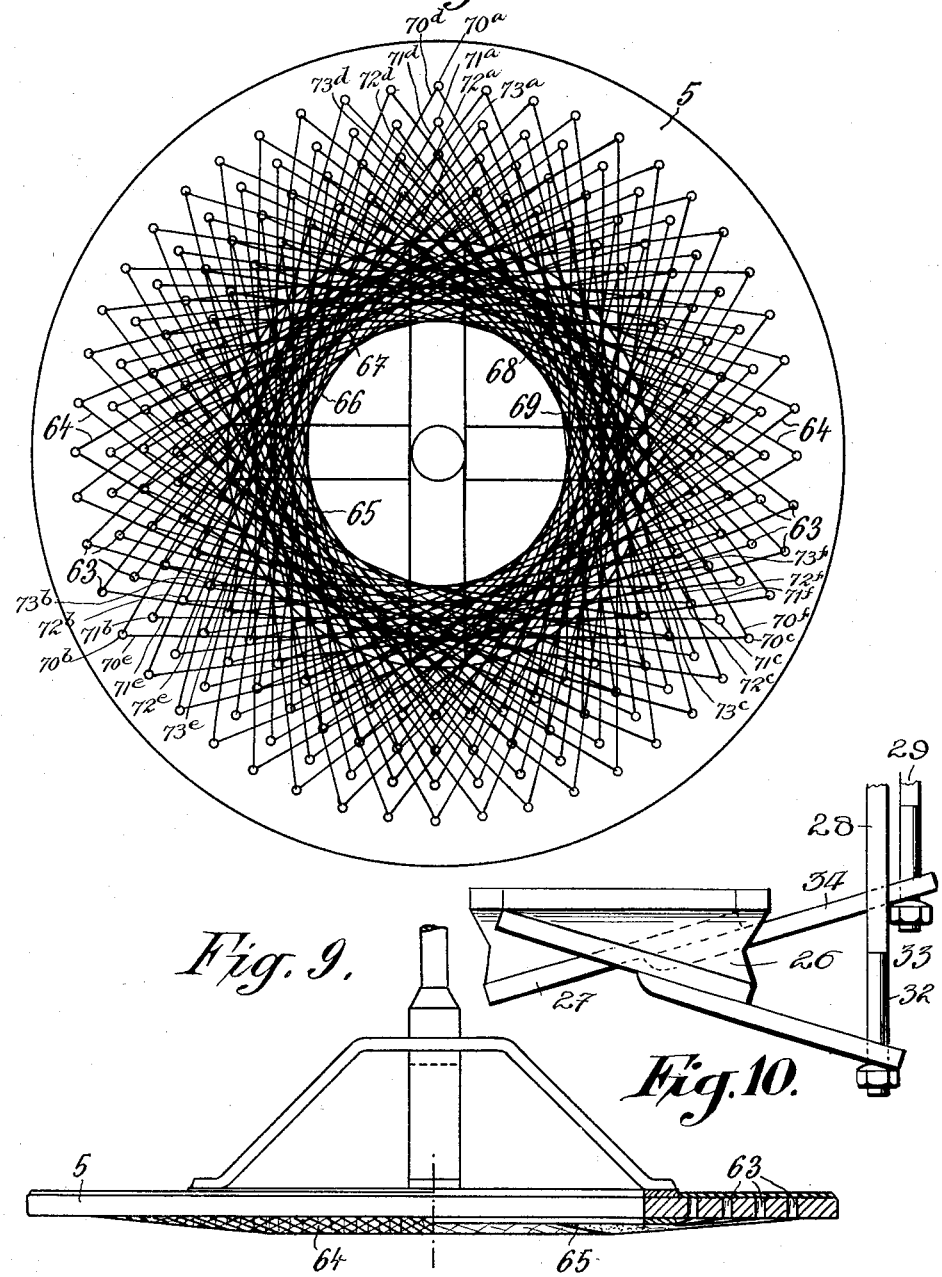

An embodiment of the invention is illustrated by way of example in the accompanying drawing, in which:

Figure 1 shows the instrument in side elevation. Fig. 2 is a plan. Fig. 3 is an end elevation. Fig. 4 is a section on the line IV—IV in Fig. 2. Fig. 5 is a section of the frame carrying the bowing member. Fig. 6 shows the damping device with a portion of the violin in plan. Fig. 7 represents the regulating casing for the air motor, partly in section. Fig. 8 shows the bowing member in underneath plan. Fig. 9 is a side elevation, half in section, and Fig. 10 shows on an enlarged scale the reversed arrangement of the two bellows for lifting the frame with the bowing member.

The instrument 2 is fixed in a somewhat oblique position on the base plate 1. It is provided with three strings, but only the middle string 3 is played, while the other two strings 3' merely serve to improve the resonance. Above the strings and above the bridge 4, the disk-shaped bowing member 5 is arranged flat and rotatably. This bowing member is driven from the crank shaft 6 on which connecting rods 7'' are mounted at an angle one with the other; these rods are also connected with the air slides 7' of the air engine 7.

A chain or cord pulley 8 is mounted on one end of the crank shaft 6 for transmitting the movement of the shaft to the bowing member 5 and a chain 9 or other appropriate transmission member drives a pulley 10 of a second shaft 11.

A cord 15 or the like passes over a pulley 12 on the shaft 11 and over a pulley 14 mounted on the shaft 13 of the bowing member and serves to rotate the bowing member from the shaft 11. The cord 15 is guided by rollers 16.

The air engine 7 is connected by the conduit 17 with the piano player mechanism influenced through the note sheet. Therefore the motor, which is of known construction is only rendered operative when the opening provided for this purpose in the music sheet permits of it.

In the casing 20 with which the hose 17 is connected, the regulating mechanism for the air motor is arranged; this consists of two bellows 18, 22 and comprises a number of valves (Fig. 7). A spring 19 normally tends to keep the bellows 18 extended and a rod 67 connects this bellows with a valve 66 which is adjustable by means of a nut 68 which screws onto the lower end of the connecting rod 67. The bellows 18 serves for regulating the uniform running of the air motor and is influenced by the direct supply of air from the reserve bellows of the player mechanism of the piano. If the supply of air to the air motor is irregular, the bellows 18 partially opens or closes the valve 66 and thus enables the air to reach the air motor uniformly, thus producing a uniform rotation of the bowing member and consequently uniform playing.

A second bellows 22 directly regulates the valve 69 by means of a sliding valve mechanism. This bellows 22 is rendered operative automatically by means of the known music-sheet perforation and is connected by a conduit 21 (Figs. 1 and 2) with a casing 25 which contains the passages communicating with the tracker board of the piano player mechanism. Where the music sheet is provided with perforations for piano playing the bellows 22 is exhausted of air through the conduit 21 so that it collapses and the valve 69 connected with it (Fig. 7) is displaced in such a manner that the passage regulated by this valve is restricted and less air supplied to the air motor. As a result the air motor and the bowing member connected therewith is driven more slowly. As soon as the music sheet no longer indicates piano playing, the bellows 22 and the valve 69 connected therewith return to their original position and the motor resumes its original speed of rotation.

A second, hand-controlled valve 70 acts upon the same passage as the valve 69; this valve 70 is connected with a pin 23 protruding from the casing 20. The valve 70 serves for adjusting the normal speed of the air motor. By displacing this pin 23 inward the supply of direct air to the air motor can be reduced and increased by shifting the pin outward, whereby the normal speed of the motor and therefore of the bowing member can be increased or reduced.

Upon the casing 25, which communicates through the conduit 21 with the casing 20 fitted to the air engine, two bellows 26, 27 (Figs. 3 and 5 are arranged; these bellows operate rods 28, 29 which serve to lift the frame 30 carrying the bowing member 5 when the latter is to be brought out of engagement with the string 3 of the instrument. Normally the frame 30 is drawn downward under the influence of gravity and of the weight of the bowing member whereby the latter is held in engagement with the string. A spring 31 serves partially to counterbalance this weight, and therefore tends to draw the frame 30 upward. The two bellows 26 and 27 are arranged reversely as shown in Figs. 3, 10, that is to say the bellows 26 opens at the right hand and the bellows 27 at the left hand end. With the movable member of the bellows 26 is connected at the right-hand end Fig. 3, a pin 32 actuating a rod 28, Fig. 5, while with a bar 34 secured to the right-hand end of the movable member of the bellows 27, there is connected a pin 33 actuating a rod 29 parallel to the rod 28. Thus when the bellows 26 and 27 are collapsed, the rods 28 and 29 will move in opposite directions.

One of the bellows 26, 27 serves to lift the frame 30 with the bowing member 5 continuously from the string while the other bellows merely serves to lift the bowing member between the separate actions upon the string. The continuous lifting of the frame with the bowing member is effected by the bellows 27, which in its normal opened position maintains the rod 29 raised and with it the frame; in the collapsed position it draws the rod 29 downward and thus allows the bowing member to descend onto the string.

By means of a spring 36 attached at 35, and engaging the bar 34, the bellows 27 is maintained in the extended position so that the rod 29 is raised.

A spring buffer 39 is arranged on the plate 38 which is connected with the casing 25 by a yoke piece 37; this buffer receives the frame 30 resiliently when the latter descends.

The lifting of the bowing member during the various intervals between the attacks upon the string is produced by the collapsing of the bellows 26, the collapsing of which lifts the rod 28 which carries with it the frame 30 and the bowing member 5.

A bellows 47 is arranged upon the support 30 for the bowing member 5 which is adapted to move upward and downward about the pivot 46; this bellows is connected with a rod 49 displaceable upward and downward and carrying the resin supporting bar 48 (Fig. 5). The resin supporting bar is carried by the rod 50 and when the bellows 47 collapses the resin supporting bar rocks upward about the point of application of the rod 50 so that its free end which carries the resin comes into engagement with the working surface of the bowing member 5. The bellows 47 is connected with the casing 25 by a conduit 51 (Figs. 2 and 3).

A bellows 40 is arranged upon the casing 25 laterally, a lever 43 rotatably mounted at 42 being connected with this bellows by a spring 41; this lever is subjected to the action of a counter spring 44 (Figs. 5 and 7). A horizontally arranged rod 45 is connected with the lever 43 which is rockable in a vertical plane. The free end of this rod 45, when the bellows 40 is being exhausted, is pressed against the bridge 4 of the stringed instrument so as to act as a damper or mute.

Another conduit 52 communicates with the casing 25 and leads to a bellows 53 (Fig. 3). This bellows acts upon a lever 55 rotatably mounted at 54 and provided with an upwardly directed projection 56. When the bellows 53 collapses, the end of the lever 55 adjacent to the bellows is lifted and the opposite, free end of this lever is depressed onto the tail piece 57 (Figs. 2 and 3). A cam plate 58 is mounted upon the crank shaft 6 of the air motor above the projection 56 of the lever 55 and when the bellows 53 collapses the cam during its rotation acts upon the projection 56 of the lever 55 and causes it to rock. These oscillations are transmitted to the tail piece 57 so that the lever 55 acts as a vibrator or tremolo device.

A number of fingers 59 are provided in the known manner for acting upon the string 3; these fingers are actuated by bellows 61 arranged in a casing 60. To permit of arranging the fingers in the closest possible proximity, two superposed rows of bellows are provided (Fig. 4), the bellows in one row being staggered relatively to those in the other, the successive fingers being actuated alternately by a bellows of the upper row and a bellows of the lower row. The air conduits for the bellows 61 are fitted to the openings 62 of the casing 60 (Fig. 4); these conduits lead to the piano player mechanism which is played in the known manner by means of a perforated music sheet and pedals.

The several bellows are all actuated from the piano player mechanism in accordance with the perforations in a music sheet, in the known manner.

The bowing member 5 which consists of a rotating disk, is strung in the manner illustrated in Figs. 7 and 8. The stringing is arranged on the lower side of the disk in a similar manner to that adopted with balls of thread. With this object four concentric rows of openings 63 are provided in the disk. Hairs 64 or the like are stretched from each opening of the innermost row symmetrically to two openings of the same row located at a given distance; this is preferably effected in such a manner that each line is formed of a number of hairs. These lines of hair inclose a circle 66. Above the stringing thus effected the same stringings of the following rows of openings are located; they inclose the concentric circles 67, 68, 69, so that all the stringings constitute an oblique bowing surface 65 (Fig. 6).

If we consider, for instance, the four openings $70^a$, $71^a$, $72^a$, and $73^a$ situated upon the same radius, hairs $70^d$, $71^d$, $72^d$, and $73^d$ respectively are stretched from said openings to openings $70^b$, $71^b$, $72^b$, and $73^b$ respectively which are arranged at 120° relatively to the first-named openings. From the second set of openings hairs $70^e$, $71^e$, $72^e$, and $73^e$ are stretched to openings $70^c$, $71^c$, $72^c$, and $73^c$, respectively, which in turn are arranged at 120° relatively to the preceding set of openings; and from this third set of openings hairs $70^f$, $71^f$, $72^f$, and $73^f$ lead back to the first-named openings $70^a$, $71^a$, $72^a$, and $73^a$ respectively. The hairs $70^d$, $70^e$, $70^f$, form a portion of the circle 69, the hairs $71^d$, $71^e$, $71^f$, form a portion of the circle 68, the hairs $72^d$, $72^e$, $72^f$, form a portion of the circle 67, and the hairs $73^d$, $73^e$, $73^f$, form a portion of the circle 66. In exactly the same manner hairs are stretched between the other openings. The circles 66, 67, 68, and 69, which lie perfectly concentrically one within the other, together with the intervening stretched hairs, constitute the inclined bowing surface 65. Owing to the slightly inclined position of the bowing member relatively to the string to be played (Fig. 1) and its slightly moved bowing surface (Fig. 4) permits the bowing surface 65 to bear upon the string in such a manner that a relatively wide and uniform bowing surface is obtained, and owing to the side strings 3' 3' being spaced from the playing strings 3 and in a lower plane than the said strings, the side strings will not be engaged by the inclined bowing members.

The instrument described can be utilized with any automatic musical instrument, such as a piano, orchestrion and also with piano players such as the phonola and pianola. It can also be connected directly with a keyboard of the harmonium kind, in which case the instrument plays only as a stringed instrument and the player operates the instrument by acting upon a bellows with the feet, while he depresses the fingers with his hands. The player is thus afforded the possibility to produce melodies in violin tones when desired and to play either in accordance with violin music in front of him or to improvise.

What I claim as my invention and desire to secure by Letters Patent of the United States is:—

1. In an automatic violin, the combination of a violin body, a string to be played fastened on the violin body, and a rotating bowing member in the form of a disk arranged approximately parallel to the violin body.

2. An automatic violin having in combination a body and a string secured thereto as usual, and a rotating bowing member in the form of a disk arranged approximately parallel to the violin body and at an acute angle to the string.

3. An automatic violin, provided with a bowing member in the form of a disk provided with a plurality of superposed hairs disposed upon the disk in such a manner that they inclose concentric circles of different diameters and form a wide and inclined uniform bowing surface.

4. In an automatic violin, the combination of a frame mounted to move up and down, a rotatable disk-like bowing member mounted upon a pivot in the frame, a string to be engaged by the bowing member said bowing member being arranged approximately parallel to the violin body, two bellows, and means for operating the frame from the two bellows, whereby the bowing member will be raised out of engagement with the string by one bellows for a long time, and by the other bellows, between two notes being sounded upon the string.

5. In an automatic violin, the combination of a tail-piece for holding a string, a pivoted lever for engaging the tail piece, a bellows connected with the lever for moving it into engagement with the tail piece, and a cam for rapidly oscillating the said lever.

In testimony whereof I have affixed my signature in presence of two witnesses.

HERMANN HEGELER.

Witnesses:
FREDERICK HOYERMANN,
WILLIAM STRUSS.

Copies of this patent may be obtained for five cents each, by addressing the "Commissioner of Patents, Washington, D. C."